INVENTOR.
ROSS C. ALDERSON
BY George H Fisher
ATTORNEY

United States Patent Office 2,751,543
Patented June 19, 1956

2,751,543

ACCELERATION LIMITING APPARATUS FOR AIRCRAFT

Ross C. Alderson, Minneapolis, Minn., assignor to Minneapolis-Honeywell Regulator Company, Minneapolis, Minn., a corporation of Delaware Application September 20, 1951, Serial No. 247,449

15 Claims. (Cl. 318—489)

This invention relates to the field of aircraft control apparatus, and more particularly to means for preventing operation of the controls of an aircraft in such a fashion as to endanger its structural safety or the welfare of its human pilot.

In aircraft design the structural characteristics of the various components are selected with normal flight in mind. While of course safety factors are also applied, a very real penalty is paid in operating efficency for each increment of unnecessary weight added to the craft, and it is not found practical to design the craft for structural safety in all conceivable maneuvers. Instead, the human pilot is relied on to so control the flight of the craft that abnormal forces will not be applied to it. The result is that inattention, inexperience, or even mere fatigue on the part of a human pilot can lead to errors in judgment which may cost the life of the pilot or cause destruction of the aircraft.

The development of automatic pilots for aircraft has not entirely eliminated this danger, since the function of an automatic pilot is ordinarily to maintain an aircraft in a condition of flight once it has been established by the human pilot: after a stabilized condition of the automatic pilot has been established, any departures from such condition are corrected for as they occur, and the necessity for applying large corrections, with the accompanying large acceleration forces on the aircraft, does not exist. In addition to this, modern automatic pilots are being provided with control sticks by means of which the human pilot may change at will the condition of flight which the automatic pilot is stabilizing. The manual exertion required from the human pilot in operating such a control member in an automatic pilot is negligible, as compared to his exertion in actually controlling the aircraft manually, and it is very easy for him to be misled into applying the relatively great power of the automatic pilot to the aircraft in such a fashion as to endanger the craft.

The greatest danger to the aircraft is found in pulling out of climbs and dives, since the accelerations due to centrifugal force resulting from "vertical" turns at high speed are very considerable. The physical effects on the human pilot of vertical accelerations are also well known, and have been given the popular names "red-out" and "black-out," depending on whether the acceleration is in the direction of the pilot's head or in the direction of his feet. As it happens, both the aircraft and the human pilot are more susceptible to damage in vertical turns where the nose of the craft is being lowered than in vertical turns where the nose of the craft is being raised. This is because of the fact that as far as the craft is concerned, the wings and their attachment to the fuselage are designed for forces acting vertically upward on the lower surfaces of the wing, since this is the direction in which force is normally applied to the wing. In a parallel fashion, aeronautical medicine has learned that more serious and more permanent injury comes to the human pilot from the addition of blood pressure in the brain caused by accelerations accompanying the lowering of the craft's nose, than by the temporary lack of blood in the brain caused by accelerations accompanying raising the nose of the craft.

It is known that the vertical accelerations are determined in magnitude both by the rate of adjustment of the craft's elevators and by the craft's airspeed, the latter result following from the fact that the effect of a given control surface displacement varies substantially as the square of the airspeed.

All the factors listed above emphasize and explain the need for some sort of an arrangement to prevent inadvertent miscontrol of the aircraft by the human pilot from resulting in such vertical accelerations as are dangerous to the structure of the craft and the health of the pilot. The purpose of the present invention is to provide such means.

It is an object of the invention to provide an improved automatic pilot having special features protecting the safety of the craft and the welfare of the human pilot.

It is another object of the invention to provide aircraft control apparatus in which excessive vertical accelerations are prevented from occurring as a result of unduly rapid changes in a control signal.

It is another object of the invention to provide aircraft control apparatus in which excessive vertical accelerations are prevented from occurring as a result of manipulation of the control stick.

It is a further object of the invention to provide an automatic pilot, which is sensitive for normal control signals, with a limiting arrangement for eliminating the anticipated effect in such an automatic pilot of large rapid changes in control signal.

It is a further object of the invention to provide an automatic pilot in which large vertical accelerations are prevented without requiring an accelerometer.

It is a further object of the invention to provide an automatic pilot which prevents injurious vertical accelerations due to rapid changes in control signal, but which is unaffected by vertical accelerations from other sources.

A still further object of the invention is to provide an automatic pilot including a control stick integrator which is converted to a simple amplifier for small rates of change of control stick signal.

Yet another object of the invention is to provide an electronic circuit including a feedback amplifier RC integrator in which the feedback circuit is interrupted for small voltages therein.

A still further object of the invention is to provide a circuit as just described, in which the interruption is accomplished by a biased diode.

A still further object of the invention is to provide apparatus as just described in which the bias on the diode is varied in accordance with the airspeed of the craft.

Various other objects, advantages, and features of novelty which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described a preferred embodiment of my invention. In the drawing:

Figure 1:
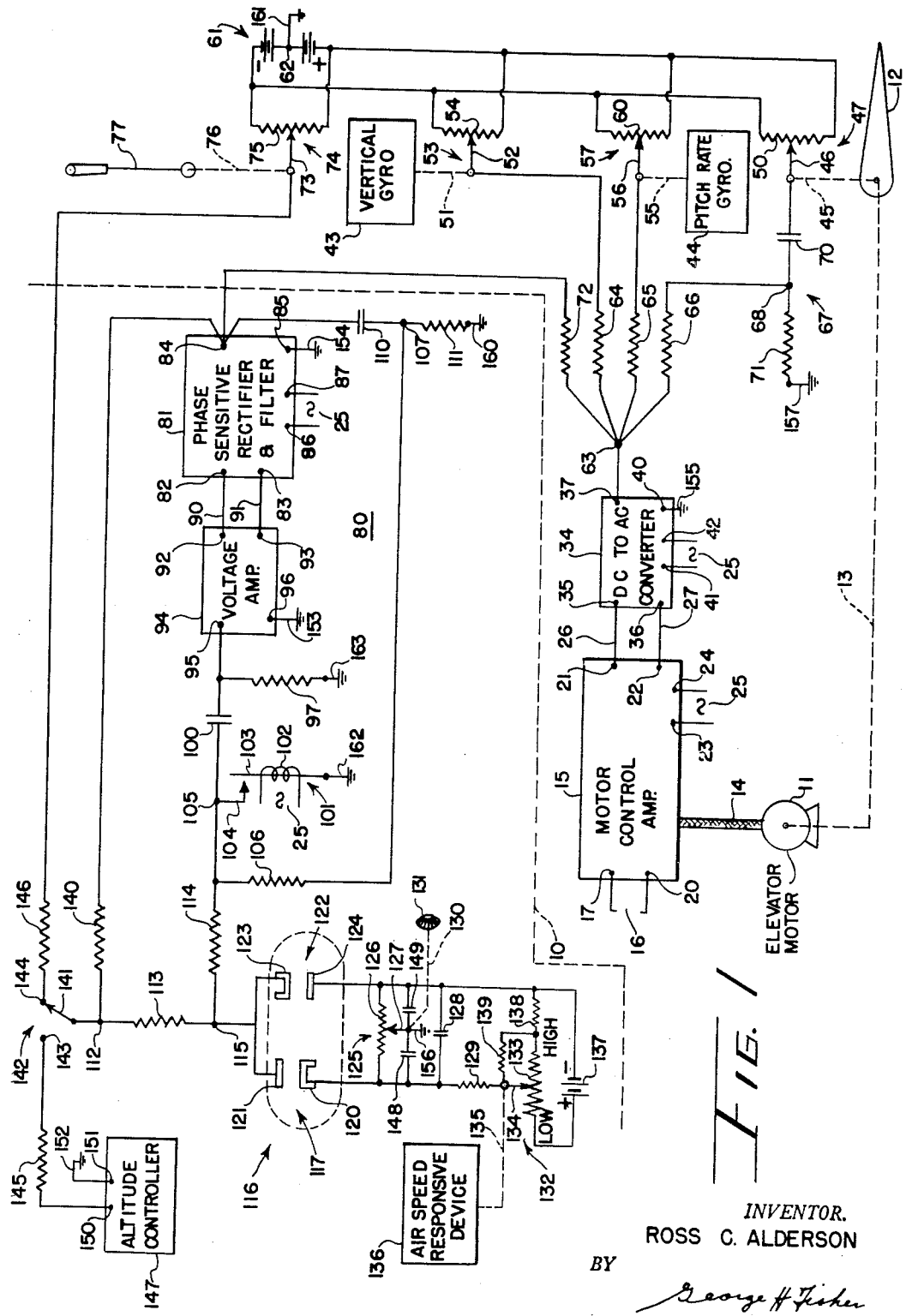
Figure 1 is a schematic showing of apparatus according to my invention.

Figure 1 shows an automatic pilot including means according to the invention for preventing operation of the automatic pilot in response to a control signal in such a fashion as to produce unsafe accelerations of the craft. The normal automatic pilot is shown below and to the right of the broken line 10 in the figure to comprise a servomotor 11 actuating the elevators 12 of the craft through a suitable mechanical connection 13. Motor 11 is energized, through a cable 14 and a motor control amplifier 15, from a source 16 of direct current connected to terminals 17 and 20 of amplifier 15, which is also provided with input terminals 21 and 22 and with further terminals 23 and 24 energized from a suitable source 25 of alternating voltage of a selected frequency. Amplifier 15 functions to cause operation of motor 11, in a forward or reverse direction in accordance with the phase of the voltage on terminals 21 and 22 compared with that on terminals 23 and 24, and at an effective speed determined by the amplitude of the former voltage, up to a predetermined maximum effective speed. One example of a suitable amplifier is to be found in Gille Patent 2,425,734, where it is used to control a pair of clutches.

The signal for amplifier 15 is supplied through conductors 26 and 27 from a D. C.-to-A. C. converter 34 having output terminals 35 and 36, input terminals 37 and 40, and power terminals 41 and 42 which are energized with alternating voltage from source 25. Converter 34 operates to supply at output terminals 35 and 36 an alternating voltage, of the frequency of source 25, which is in phase with the source or 180° out of phase with the source according as a unidirectional voltage applied to input terminals 37 and 40 is of one polarity or the other.

The input to converter 34 is normally determined by the movement of elevators 12, and by the responses of a vertical gyroscope 43 and a pitch rate gyroscope 44 to the movements of the aircraft. To this end mechanical connection 13 is extended at 45 to actuate the slider 46 of a voltage divider 47 having a winding 50. Vertical gyroscope 43 acts through a mechanical connection 51 to position the slider 52 of a second voltage divider 53 having a winding 54, and pitch rate gyroscope 44 acts through a mechanical connection 55 to actuate the slider 56 of a voltage divider 57 having a winding 60.

Windings 50, 54 and 60 are energized in parallel from a source 61 of unidirectional voltage having a central tap 62. Sliders 52 and 56 are connected to a summation terminal 63 through summing resistors 64 and 65. Slider 46 is connected to summation terminal 63 through summing resistor 66 and a rate network 67 comprising a capacitor 70 and a resistor 71. Also connected to summation terminal 63 is a further summing resistor 72 which is ordinarily connected to the slider 73 of a voltage divider 74 having a winding 75 energized from source 61. Slider 73 is designed for adjustment, through a suitable mechanical connection 76, by a control stick 77.

According to the present invention, however, there is interposed between summing resistor 72 and slider 73 an acceleration limiter 80. As is shown above and to the left of broken line 10 in the drawing, limiter 80 comprises a phase sensitive rectifier and filter unit 81 having input terminals 82 and 83, output terminals 84 and 85, and power terminals 86 and 87 energized with alternating voltage from source 25. The function of this component of the limiter is to provide at output terminals 84 and 85 a unidirectional voltage which varies in magnitude and reverses in polarity with variation in the amplitude and reversal in the phase of an alternating voltage applied to input terminals 82 and 83, the standard of phase being that supplied from source 25.

Input terminals 82 and 83 are energized, through conductors 90 and 91, from the output terminals 92 and 93 of a high gain voltage amplifier 94 having input terminals 95 and 96. Amplifier 94 is of conventional structure and operates to supply at output terminals 92 and 93 an alternating voltage of the same frequency and phase as the voltage supplied at input terminals 95 and 96, but of increased amplitude.

The input circuit to amplifier 94 includes an input resistor 97, a coupling capacitor 100, and a vibrator 101 comprising a winding 102 energized from source 25 to cause oscillation of a movable contact 103 into and out of engagement with a fixed contact 104 at the frequency of the source.

The input voltage to amplifier 94 is made up of a signal component and a feedback component. The signal component may be supplied by operation of control stick 77, or it may come from some other control device such as an altitude controller. The feedback component includes a first portion which varies in accordance with the output from unit 81, and a second portion which varies in accordance with the rate of change of that output. The structure for supplying these voltage components will now be described.

Fixed contact 104 of vibrator 101 is connected to a summation terminal 105, as is capacitor 100. This terminal is degeneratively energized, through a summing resistor 106, from the common terminal 107 between a capacitor 110 and a resistor 111, the two being connected in a series circuit energized from the output of unit 81. Summation terminal 105 is also energized from a further summation terminal 112 through a series circuit including a dropping resistor 113 and an isolating resistor 114. The common terminal 115 between resistors 113 and 114 is connected to a limiting circuit 116 including a first diode 117 having a cathode 120 and an anode 121, a second diode 122 having a cathode 123 and an anode 124, and a voltage divider 125 having a winding 126 shunted by a filter condenser 128 and a slider 127 actuated through a mechanical connection 130 by a knob 131.

Winding 126 is connected in series with a fixed resistor 129 to jointly comprise a voltage divider connected between the slider 134 of a voltage divider 132, having a winding 133, and the negative terminal of a source 137 of unidirectional voltage which is preferably well regulated. Winding 133 is connected in series with a fixed resistor 138 to comprise a voltage divider across the source, and gives an output which is varied, through a mechanical connection 135 to slider 134, by an air speed responsive device 136. A loading resistor 139 is provided to characterize the voltage divider, so that its output varies substantially as the square root of the slider displacement, rather than linearly therewith. A pair of further capacitors 148 and 149 are provided to filter out any transient voltages relative to ground which are of high frequency compared to the normally very slow changes in voltage caused by device 136.

Summation terminal 112 is degeneratively energized, through summing resistor 140, from the output of unit 81, and is also connected to the movable contact 141 of a switch 142 having a pair of fixed contacts 143 and 144. Fixed contact 143 is connected through a summing resistor 145 to an altitude controller 147, which supplies a unidirectional voltage between a pair of output terminals 150 and 151, and fixed contact 144 is connected through a summing resistor 146 to slider 73 of voltage divider 74. Resistors 140 and 146 are of the same resistance.

Altitude controller 147 may comprise any arrangement which gives a desired output when the craft departs from its selected altitude. One suitable arrangement for use in this connection is shown in the copending application of Robert J. Kutzler, Serial No. 208,391, filed January 29, 1951, and assigned to the assignee of the present application.

Terminal 151 of altitude controller 147, terminal 96 of amplifier 94, terminal 85 of unit 81, terminal 40 of converter 34, slider 127 of voltage divider 125, the terminals of resistors 71 and 111 remote from terminals 68 and 107, center tap 62 of source 61, movable contact 101 of vibrator 101, and the lower end of resistor 97 are grounded at 152, 153, 154, 155, 156, 157, 160, 161, 162, and 163 respectively, to complete the necessary circuits in the apparatus.

Operation

In describing the operation of the apparatus it will first be assumed that the craft is in stable flight with a fixed desired pitch attitude, and that this condition has prevailed for a sufficient interval so that all portions of the apparatus have come into equilibrium. It will also be assumed that source 25 is supplying alternating voltages to the various components where indicated, that sliders 73, 52, 56, 46, and 127 are at the centers of their respective windings, that switch 142 is completing the connection between fixed contact 144 and movable contact 141, and that the various electronic components of the apparatus have been warmed up to stable operating conditions by conventional means. Under these conditions the voltages on summation terminals 63, 105, and 112 are all zero, unit 81 is giving no output, and motor 11 is not operating. The position of slider 134 along winding 133 is determined by the indicated airspeed of the craft, which for illustration may be taken as a minimum value of 90 knots.

If for some reason the craft is caused to change its pitch attitude, as by reason of a gust of wind, slider 52 is displaced with respect to winding 54 in accordance with the amount of the displacement, and slider 56 is displaced with respect to winding 60 in accordance with the rate of the displacement. By the familiar principles of parallel addition of voltages, the voltage at summation terminal 63 is proportional to the sum of the two voltages supplied from sliders 52 and 56. This voltage is converted to alternating voltage of a proper phase and amplitude in converter 34 and impressed on amplifier 15. Motor 11 is energized to operate, adjusting elevators 12 and slider 46 at an effective speed determined by the voltage on terminal 63. The displacement of slider 46 supplies a further voltage to terminal 63 modifying the voltages supplied by sliders 52 and 56, and the change in craft attitude resulting from elevator displacement also changes the positions of sliders 52 and 56 and the voltages they supply. The apparatus regains a condition of equilibrium when the craft has regained its original pitch attitude and the elevators are again in their original position.

If now the human pilot desires to cause a change in the pitch attitude of the craft, he operates control stick 77, displacing slider 73 from the center of winding 75. In apparatus prior to my invention this applies a voltage from slider 73 through resistor 72 to converter 34 to cause operation of motor 11, thus changing the elevator position and hence the pitch attitude of the craft. This latter change results in displacement of slider 52 relative to winding 54, by vertical gyroscope 43, to give a voltage of the opposite sense. Voltages are also supplied by sliders 46 and 56. If the stick is held in a displaced position for an appreciable period, the transient voltages from slider 46 and 56 die out, and the craft assumes a stable pitch attitude displaced from its original pitch attitude by an amount proportional to the extent of operation of stick 77.

As long as the human pilot operates the actual control stick of the craft, with its "feel" of the forces acting on the elevators, he is not likely, and in some cases is not able, to move the stick so fast as to cause dangerous vertical accelerations. However, when stick 77 is merely a handle for adjusting one or more voltage dividers, no back forces on the stick result from its operation, and inexperience or excitement can cause the human pilot to move the stick rapidly through its full travel, impressing a maximum voltage on resistor 72 at a high rate. This would result in rapid operation of motor 11 to adjust elevators 12 to their extreme position, because the automatic pilot must be sensitive and quick acting if it is to provide stable control of the craft for small deviations from the stabilized course. Vertical accelerations have been known to result, from this type of operation of an aircraft by a human pilot, which were of sufficient magnitude to tear the wings off the craft and to incapacitate the human pilot.

It is not the magnitude of the voltage at resistor 72, but its rate of change, which has the undesirable effect just described. The pitch attitude of the craft is proportional to the displacement of the control stick, but no pitch attitude per se is more dangerous than any other, within the normal limits of automatic pilot operation. The rate of change of the voltage at resistor 72, however, determines the rate at which the craft attempts to assume the new attitude, and hence determines the vertical accelerations to which craft and pilot are subjected at any particular airspeed. To prevent dangerous accelerations it is necessary that a limit be placed on the rate at which the voltage on resistor 72 may vary, without, however, placing any limit on the final value that voltage may assume.

It is the function of apparatus 80 therefore to so connect slider 73 with resistor 72 that, regardless of the rate of adjustment of stick 77, the voltage on resistor 72 resulting therefrom can never vary at an excessive rate, the permitted maximum being varied in accordance with the airspeed of the craft and depending on the sense of the displacement of stick 77, but the final voltage on resistor 72 being the same as it would have been without apparatus 80. The means whereby this is accomplished have been set out above, and their probable method of operation will now be described. A step function voltage will be assumed, since this is the most severe case, and results when control stick 77 is slammed instantly through its full travel: the modifications resulting from less abrupt operation of the control stick are obvious and will not be described in detail.

Figure 2:
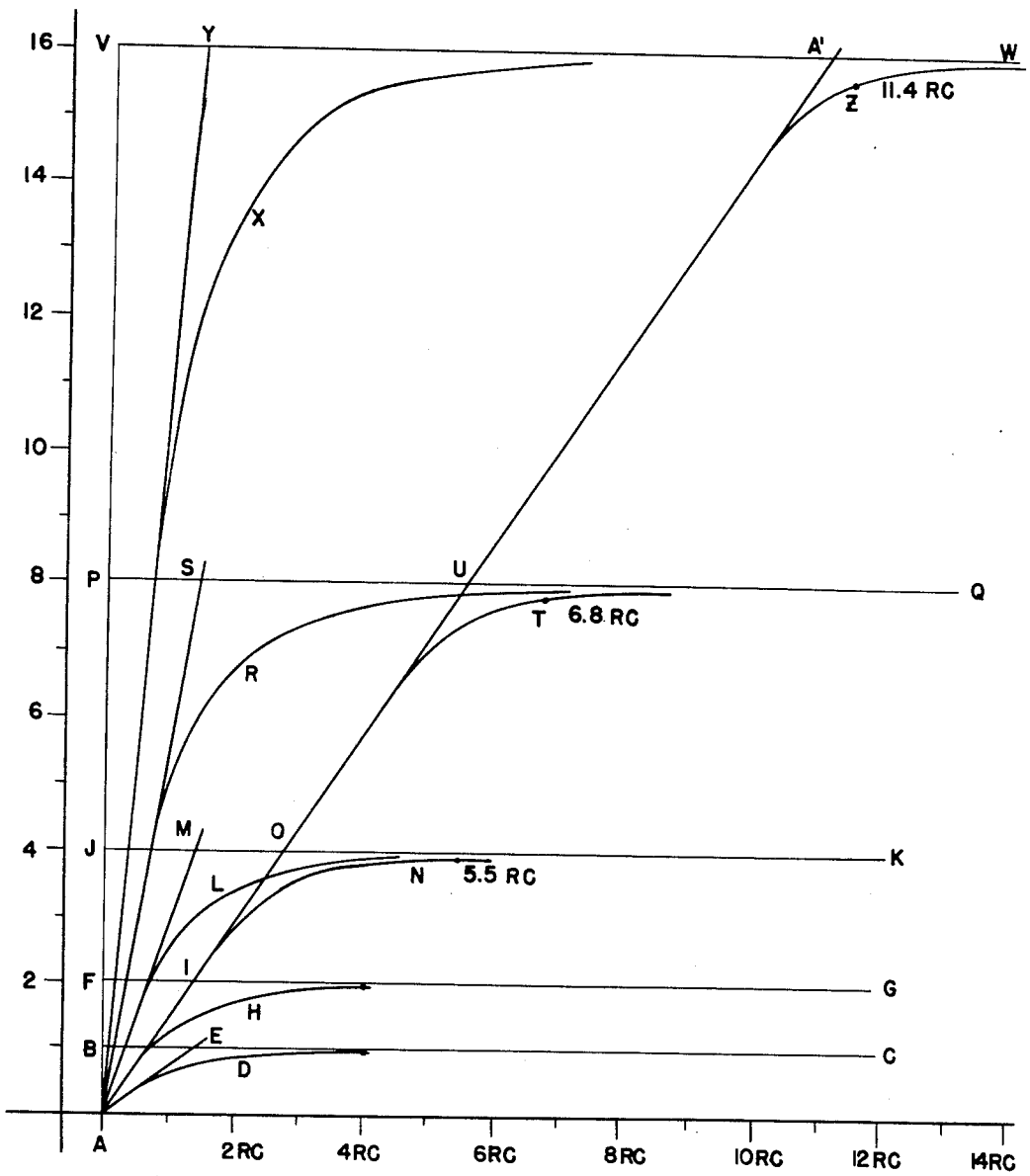
Figure 2 is a diagram illustrative of the mode of operation of the apparatus.

Figure 2 is a plot of voltage against time. The latter is measured in increments of RC seconds, the time constant of the system, where C is the capacitance of capacitor 110 and R is the effective resistance from terminal 107 to ground.

For purposes of explanation let it first be assumed that terminal 115 is disconnected from limiting circuit 116. Each time vibrator 101 completes the circuit between contact 104 and ground, the voltage appearing at slider 73 is applied across a voltage divider made up of resistors 146, 113, and 114 in series. Resistor 114 is large compared to resistors 113 and 146, so that almost all the applied voltage appears at terminal 115. If a step voltage of 1 volt is applied at slider 73, as indicated by the curve ABC in Figure 2, the output voltage at terminal 84 follows the exponential curve AD, approaching the line BC asymptotically. This is because the apparatus has a steady state overall gain of 1 from terminal 73 to terminal 84, so that the voltage applied through resistor 72 to terminal 63 is the same as that at slider 73, after transient effects have subsided.

The initial rate of change of output voltage, or the slope of curve AD at the point A, is indicated by the line AE, and is of magnitude $E/RC$. At the end of 4 RC seconds from the initial instant, the voltage is within 2% of its final value, or is .98 volt.

If the input step voltage is 2 volts, as indicated by the curve AFG, the output voltage at terminal 84 follows the exponential curve AH having an initial slope AI. Similarly for a 4 volt step voltage AJK the output follows the curve AL having an initial slope AM, for an 8 volt step voltage APQ the output voltage follows the curve AR having an initial slope AS, and for a 16 voltage step voltage AVW the output follows the curve AX having an initial slope AY.

The general operation of limiter 80, except for the action of limiting circuit 116 and the feedback loop through resistor 140, and for the negligible modifying effect of resistor 111, is discussed in detail under the caption "feedback amplifier RC integrators," beginning on page 79 of "Electronic Instruments," volume 21 of the Radiation Laboratory Series, published in 1948 by McGraw-Hill Book Company. The effect of the feedback loop through resistor 140 has been mentioned above. The purpose of circuit 116 will now be explained.

The initial slope of each of the exponential curves just identified and its final value are determined by the constant value of the impressed voltage E. It is accordingly possible to limit the initial slope of the curve, and hence the rate of change of voltage on resistor 72, the rate of adjustment of the elevators, and ultimately the vertical accelerations of the craft, by limiting the voltage at terminal 115. If this can be done without also limiting the ultimate voltage assumed by terminal 84, the object of the invention is achieved.

The desirable function just described is accomplished by limiter diodes 117 and 122 and their associated apparatus. A circuit may be traced from the negative terminal of source 137 through winding 126, resistor 129, slider 134, and the portion of winding 133 to the left of the slider, to the positive terminal of source 137. Flow of current in this circuit causes a voltage drop along winding 126, making the left hand end of the winding positive and the other end negative. Anode 121 and cathode 123 are connected to slider 127 through terminal 115, resistor 114, terminal 105, contacts 104 and 103 of vibrator 101 and ground connections 162 and 156. Cathode 120 is maintained positive with respect to slider 127 by the amount of the voltage drop in the portion of winding 126 to the left of the slider. Similarly anode 124 is maintained negative with respect to slider 127 by the amount of voltage drop in the portion of winding 126 to the right of the slider. The anodes of both diodes are thus negative with respect to their cathodes; no current flows in either diode and hence there is no voltage drop in resistor 114. This condition continues as long as the potential of point 115 is determined only by slider 127. For present discussion let it be assumed that slider 134 is set so that the voltage drop across winding 126 is 4 volts. Then since slider 127 is assumed to be at the center of winding 126, and since there is no voltage drop in resistor 114, anode 124 is 2 volts negative with respect to cathode 123, and anode 121 is 2 volts negative with respect to cathode 120.

A circuit may be traced from slider 73 through summing resistor 146, summation terminal 112, dropping resistor 113, terminal 115, isolating resistor 114, terminal 105, and contacts 104 and 103 of vibrator 101 to ground, so that when the vibrator contacts are engaged, current flows in resistor 114 and a voltage drop appears thereacross, the polarity of which is determined by the polarity of the voltage on slider 73. When slider 73 is displaced upwardly to such an extent that this voltage drop becomes more than 2 volts positive, for example 4 volts positive, terminal 115 and hence anode 121 are positive with respect to cathode 120, and current begins to flow in diode 117. The operation of diode 117 in conjunction with resistor 113 is now that of a conventional limiter, and as the voltage on slider 73 further increases, the current in the diode and the voltage drop across resistor 113 increase so that there is only a negligible increase in voltage between terminal 105 and ground.

As a result of the continuous 2 volt potential on terminal 105, an output voltage appears at terminals 84 and 85. If this voltage were fed back directly to terminal 105, the curve AH of Figure 2 would still describe the voltage at terminal 84. The feedback is not direct, however, but is made through a voltage divider comprising resistors 140, 113 and 114. Resistors 113 and 114 are common to the feedback circuit from terminal 84 and the signal circuit from slider 73, and the voltage at terminal 112 is proportional to the difference of the two currents in these resistors. The voltage drop in resistor 113 is the major portion of this difference, and, the feedback voltage at first being small, the difference continues larger than two volts and the output voltage continues to increase substantially at the initial rate of the curve AH.

Thus, although the voltage of terminal 115 remains substantially 2 volts, the output voltage of terminal 84 continues to increase, according to the curve AN, having the initial slope AO rather than AM: when the feedback voltage become greater than 2, diode 117 ceases to conduct and the curve from then on is a duplicate of AH except that it is asymptotic to curve AJK rather than to curve AFG.

The same situation prevails for larger values at input voltage. Thus if the input is a step voltage 8 volts the output voltage follows a curve AT having the initial slope AU, rather than following the curve AR with its initial slope AS, and if the input is a step voltage of 16 volts, the output voltage follows the curve AZ having the initial slope AA', rather than following the curve AX with the initial slope AY.

It should be emphasised that the line AIOUA' is a straight line to which the curves AH, AN, AT and AZ are tangent at various ordinates.

If the signal on slider 73 is of the opposite polarity, the operation of the apparatus is as just described, except that it is diode 122 rather than diode 117 that performs the limiting function.

The purpose of limiter 116 will now be apparent. For signal voltages of less than a selected value determined by sliders 127 and 134 the output varies at a rate determined by the magnitude of the signal voltage, while for signal voltages of larger values the output varies at a rate which cannot exceed that for a signal of the selected value. It is thus apparent that by limiting the voltage at terminal 115, I have limited the rate of change of the output voltage for terminal 63, although the output voltage ultimately reaches the same value it would have assumed more rapidly without the limiter.

The output voltage at terminals 84 and 85 is supplied through ground connections 154 and 155 and through summing resistor 72 to converter 34 and amplifier 15, and causes operation of motor 11 to adjust elevators 12 at a rate determined by the magnitude of the voltage. Displacement of the elevators causes the craft to begin to change its pitch attitude: the magnitude of the change is sensed by vertical gyroscope 43 and its rate is sensed by rate gyroscope 44, each of which supplies voltages to terminal 63. The rate component of the voltage supplied at terminals 84 and 85 is opposed by the output of the rate gyroscope, and the magnitude component of the signal voltage is opposed by the output of the vertical gyroscope. The signal from network 67 is of transient importance, and merely makes for smooth operation of the apparatus as a whole.

The system eventually reaches a new condition of equilibrium, in which stable flight prevails at a new pitch attitude. The rate at which the pitch attitude is changed depends on the lag between the voltage on terminals 84 and 85 and the voltage on slider 52, which lag is a characteristic of the particular airframe in question. In any event, the speed of operation of the automatic pilot is such that the portions of all the curves AD, AH, AM, AT, and AZ occurring after $$\frac{RC}{2}$$

seconds from the initial instant are not significant. Within this interval, all the curves are substantially linear, and curves AH, AN, AT, AZ are coincident.

When the craft is in flight at high speed, only a slight displacement of the elevators is necessary to produce a desired change in pitch attitude, and only a small rate of pitch can be tolerated if excessive vertical accelerations are to be avoided. On the other hand, when the craft is in flight at low speeds, greater displacement of the elevators is necessary to produce a desired change in pitch attitude, and considerably greater rate of pitch can be tolerated. Slider 134 is displaced to the right in accordance with increasing airspeed of the craft, to vary the voltage between terminal 115 and ground at which the diodes begin to discharge. The effect of this is to cause the line AA' to approach the line AE, still further limiting the rate of change of the output voltage for larger input voltages, although not limiting the final value of the output voltage.

The apparatus just described has the great advantage, for most purposes, over apparatus equipped with physical accelerometers, that it acts only to reduce the effect on the automatic pilot of control signals applied thereto, and does not directly respond to vertical accelerations to which the craft may be subjected, by means of vertical air currents, for example.

If it is desired to permit greater rates of change of pitch attitude in one sense than in the other sense, slider 127 may be moved away from its central position on winding 126. If the slider is moved halfway to the left, for example, limiter 116 will begin to operate through diode 117 when terminal 115 is 1 volt positive with respect to ground, but will not begin to operate through diode 122 until cathode 123 is 3 volts negative with respect to ground. The same proportion holds true if slider 134 is moved to give a voltage other than 4 volts across winding 126.

The use of my arrangement is not limited to signals from control stick 77, but may also be found advantageous when the control signal is from altitude controller 147. When this type of operation is desired, switch 142 is thrown so that movable contact 141 engages fixed contact 143, disabling control stick 77 and completing a circuit from terminal 150 of altitude controller 147 through summing resistor 145 and switch 142 to terminal 112.

Whenever the signal from the altitude controller exceeds that at which limiter 116 is set to begin discharging, the effect illustrated in Figure 2 takes place as before. If a craft enters a thermal current, for example, that lifts it several hundred feet very rapidly, the output from altitude controller 147, which may be set to control at plus or minus 25 feet change in elevation, changes from near zero to maximum output in a very short time. This corresponds to rapid full movement of the control stick 77, and the apparatus functions just as before.

It is to be noted that the operation of the apparatus when switch 142 is thrown to the left is not responsive to the accelerations of the craft resulting from its entry into the vertical air current, but is effective only to prevent any control signal from being introduced into the automatic pilot, in response to the altitude deviations caused by the vertical current, which would be capable per se of causing dangerous accelerations of the craft while the altitude error is being corrected.

Numerous objects and advantages of my invention have been set forth in the foregoing description, together with details of the structure and function of the invention, and the novel features thereof are pointed out in the appended claims. The disclosure, however, is illustrative only, and I may make changes in detail, especially in matters of shape, size, and arrangement of parts, within the principle of the invention, to the full extent indicated by the broad general meaning of the terms in which the appended claims are expressed.

I claim as my invention:

1. Apparatus of the class described comprising, in combination: a controlling member actuable to give a signal of variable magnitude and rate of change; a controlled member to be positioned in accordance with the magnitude of said signal, and at a maximum rate which is less than the maximum rate of change of said signal; and control means energized from said signal to actuate said controlled member, including a feedback amplifier resistance-capacitance integrator giving a control output in accordance with the time integral of an input including said signal; feedback means modifying said signal in accordance with said output to comprise said input; and means limiting the effective value of said input to a selected maximum regardless of the magnitude or rate of change of said signal.

2. Apparatus of the class described comprising, in combination: a controlling member actuable to give a signal of variable magnitude and rate of change; a controlled member to be positioned in accordance with the magnitude of said signal, and at a maximum rate which is less than the maximum rate of change of said signal; control means energized from said signal to actuate said controlled member, including means giving a control output in accordance with the time integral of an input including said signal; feedback means modifying said signal in accordance with said output to comprise said input; adjustable means limiting the effective value of said input to a selected maximum value regardless of the magnitude or rate of change of said signal; and means adjusting said limiting means so that the selected maximum value is different for signals of opposite senses.

3. Apparatus of the class described comprising, in combination: a controlling member adjustable to give a first signal of variable magnitude and rate of change; a controlled member to be positioned in accordance with the magnitude of said first signal, and at a maximum rate which is less than the maximum rate of change of said first signal; and control means energized from said signal to actuate said controlled member, including a linear amplifier, means applying said signal to said amplifier, a resistance-capacitance network energized with the output of said amplifier to give a second signal proportional to the rate of change of said output, negative feedback means applying said second signal to said amplifier so as to oppose said first signal, and means connected to said amplifier for preventing the resulting signal applied to said amplifier from exceeding a selected maximum value.

4. Apparatus of the class described comprising, in combination: a controlling member adjustable to give a first signal of variable magnitude and rate of change; a controlled member to be positioned in accordance with the magnitude of said first signal, and at a maximum rate which is less than the maximum rate of change of said first signal; and control means energized from said first signal to actuate said controlled member, including a linear amplifier, means applying said signal to said amplifier, a resistance-capacitance network energized with the output of said amplifier to give a second signal proportional to the rate of change of said output, negative feedback means applying said second signal to said amplifier so as to oppose said first signal, and further negative feedback means applying said output to said amplifier to further oppose said first signal, to determine the steady state output from said amplifier which results from any input signal.

5. Apparatus of the class described comprising, in combination: a controlling member adjustable to give a first signal of variable magnitude and rate of change; a controlled member to be positioned in accordance with the magnitude of said first signal, and at a maximum rate which is less than the maximum rate of change of said first signal; and control means energized from said first signal to actuate said controlled member, including a linear amplifier, means applying said signal to said amplifier, a resistance-capacitance network energized with the output of said amplifier to give a second signal proportional to the rate of change of said output, negative feedback means applying said second signal to said amplifier so as to oppose said first signal, means limiting the effective value of the signal applied to said amplifier to a selected maximum value, and further negative feedback means applying said output to said amplifier to further oppose said first signal, so as to determine the steady state output from said amplifier which results from any input signal.

6. Apparatus of the class described comprising, in combination: a controlling member adjustable to give a first signal of variable magnitude and rate of change; a controlled member to be positioned in accordance with the magnitude of said first signal, and at a maximum rate which is less than the maximum rate of change of said first signal; and control means energized from said signal to actuate said controlled member, including a linear amplifier, means applying said signal to said amplifier, a resistance-capacitance network energized with the output of said amplifier to give a second signal proportional to the rate of change of said output, negative feedback means applying said second signal to said amplifier so as to oppose said first signal, and biased diode means limiting the effective value of the signal applied to said amplifier to a selected maximum value.

7. Apparatus of the class described comprising, in combination: a member to be controlled; a controlling member; telemetric means normally causing uniform operation of said controlled member in response to uniform operation of said controlling member; feedback means in said telemetric means for causing the responsive operation of said controlled member to take place more slowly than the operation of said controlling member; and signal limiting means in said telemetric means for rendering the operation of said telemetric means nonuniform for uniform operation of said controlling member of large extent.

8. Apparatus of the class described comprising, in combination: a member to be controlled; a controlling member; telemetric means normally causing uniform operation of said controlled member in response to uniform operation of said controlling member; means in said telemetric means for causing the responsive operation of said controlled member to take place more slowly than the operation of said controlling member; adjustable signal limiting means in said telemetric means for rendering the operation of said telemetric means nonuniform for uniform operation of said controlling member of large extent; and means for adjusting said adjustable means in accordance with a variable condition.

9. Apparatus of the class described comprising, in combination: means for adjusting the elevators of an aircraft in proportion to an input signal; means supplying a signal thereto which varies in magnitude and sense with a first condition; adjustable means for preventing said signal from exceeding a value predetermined by the adjustment thereof; and means adjusting said last named means in accordance with the airspeed of the craft.

10. Apparatus of the class described comprising, in combination: means for adjusting the elevators of an aircraft in proportion to an input signal; manually operable means supplying a signal thereto of variable magnitude and reversible sense; adjustable means for preventing said signal from exceeding a value selected by the adjustment thereof; and means adjusting said last named means in accordance with the airspeed of the craft.

11. Apparatus of the class described comprising, in combination: means for adjusting the elevators of an aircraft in proportion to an input voltage; means supplying a voltage thereto which varies with operation of a control stick; adjustably biased full wave rectifying means for limiting said voltage; and means adjusting the bias on the rectifiers of said rectifying means to limit said voltage at a first value when it is of one sense and at a second value when it is of the opposite sense.

12. Apparatus of the class described comprising, in combination: a controlling member adjustable to give a voltage of continuously variable magnitude and rate of change; a controlled member to be positioned in accordance with the magnitude of said voltage and at a maximum rate which is less than the maximum rate of change of said voltage; and controlling means energized from said voltage to actuate said controlled member, including adjustably biased full wave rectifying means for limiting said voltage in accordance with the extent of the bias on said rectifying means, to prevent said voltage from exceeding a predetermined value.

13. Apparatus of the class described comprising, in combination: a controlling member adjustable to give a voltage of continuously variable magnitude and rate of change; a controlled member to be positioned in accordance with the magnitude of said voltage and at a maximum rate which is less than the maximum rate of change of said voltage; controlling means energized from said voltage to actuate said control member, including adjustably biased rectifying means for limiting said voltage in accordance with the extent of the bias of said rectifying means to prevent said voltage from exceeding a predetermined mean value; and further including means differentially adjusting the extent of said bias on said rectifying means, to cause said limiting to occur at a first value when said voltage is of a first sense and at a second value when said voltage is of the opposite sense.

14. Apparatus of the class described comprising, in combination: a controlling member adjustable to give a first signal of variable magnitude and rate of change; a controlled member to be positioned in accordance with the magnitude of said first signal, and at a maximum rate which is less than the maximum rate of change of said first signal; and control means energized from said signal to actuate said controlled member, including a linear amplifier, means applying said signal to said amplifier, a resistance-capacitance network energized with the output of said amplifier to give a second signal proportional to the rate of change of said output, negative feedback means applying said second signal to said amplifier so as to oppose said first signal, adjustably biased full wave diode means limiting the effective value of the resulting signal applied to said amplifier to a selected maximum value, and means adjusting the extent to which said diode means is biased in accordance with a condition.

15. Apparatus of the class described comprising, in combination: a controlling member adjustable to give a first signal of variable magnitude and rate of change; a controlled member to be positioned in accordance with the magnitude of said first signal, and at a maximum rate which is less than the maximum rate of change of said first signal; and control means energized from said signal to actuate said controlled member, including a linear amplifier, means applying said signal to said amplifier, a resistance-capacitance network energized with the output of said amplifier to give a second signal proportional to the rate of change of said output, negative feedback means applying said second signal to said amplifier so as to oppose said first signal, adjustably biased full wave diodes limiting the effective value of the resultant signal applied to said amplifier to a selected maximum value, and means differentially adjusting the extent to which the diodes are biased to cause said limiting to occur at different values for resultant signals of different senses.

References Cited in the file of this patent

UNITED STATES PATENTS

| 2,356,339 | Morrison | Aug. 22, 1944 |
| 2,387,795 | Isserstedt | Oct. 30, 1945 |
| 2,415,429 | Kellogg et al. | Feb. 11, 1947 |
| 2,448,564 | Wilkerson | Sept. 7, 1948 |
| 2,450,907 | Newton et al. | Oct. 12, 1948 |
| 2,492,863 | Hays | Dec. 27, 1949 |
| 2,552,348 | Shapiro et al. | May 8, 1951 |
| 2,553,597 | Maroni | May 22, 1951 |
| 2,558,850 | Hofstadter | July 3, 1951 |
| 2,582,305 | Young | Jan. 15, 1952 |
| 2,623,715 | Newton | Dec. 30, 1952 |